(12) United States Patent
Loper

(10) Patent No.: US 7,776,399 B1
(45) Date of Patent: Aug. 17, 2010

(54) METHOD FORMING A POLYURETHANE COATED CELLULAR POLYVINYLCHLORIDE BOARD FOR USE AS SIDING

(75) Inventor: Thomas Loper, Wilbraham, MA (US)

(73) Assignee: NuCedar Mills, Inc., Chicopee, MA (US)

( * ) Notice: Subject to any disclaimer, the term of this patent is extended or adjusted under 35 U.S.C. 154(b) by 411 days.

(21) Appl. No.: 11/830,554

(22) Filed: Jul. 30, 2007

Related U.S. Application Data

(60) Provisional application No. 60/820,728, filed on Jul. 28, 2006.

(51) Int. Cl.
B05D 3/02 (2006.01)

(52) U.S. Cl. .............. 427/384; 427/385.5; 427/393.5; 427/421.1; 427/427.4; 427/427.6; 427/427.7

(58) Field of Classification Search ............ None
See application file for complete search history.

(56) References Cited

U.S. PATENT DOCUMENTS

| | | | | |
|---|---|---|---|---|
| 4,154,887 A | * | 5/1979 | Morshauser et al. | 428/201 |
| 4,353,949 A | * | 10/1982 | Kyminas et al. | 428/195.1 |
| 4,546,045 A | * | 10/1985 | Elias | 428/424.6 |
| 4,622,191 A | * | 11/1986 | Takeuchi | 264/134 |
| 6,482,474 B1 | * | 11/2002 | Fenn et al. | 427/385.5 |
| 7,204,062 B2 | * | 4/2007 | Fairbanks et al. | 52/522 |
| 7,482,038 B1 | * | 1/2009 | Loper | 427/290 |
| 2004/0040237 A1 | * | 3/2004 | Van Ootmarsum | 52/302.1 |
| 2004/0192794 A1 | * | 9/2004 | Patterson et al. | 521/84.1 |
| 2005/0016694 A1 | * | 1/2005 | Jella | 160/236 |
| 2005/0081475 A1 | * | 4/2005 | Edger et al. | 52/698 |
| 2005/0266222 A1 | * | 12/2005 | Clark et al. | 428/292.1 |

* cited by examiner

*Primary Examiner*—Erma Cameron
(74) *Attorney, Agent, or Firm*—Deborah A. Basile; Karen K. Chadwell; Doherty, Wallace, Pillsbury & Murphy, P.C.

(57) ABSTRACT

A method for forming a polyurethane coated cellular polyvinylchloride board, comprising: de-ionizing a cellular polyvinylchloride board; vacuuming the cellular polyvinylchloride board; coating the cellular polyvinylchloride board with a coating comprising a polyurethane-based paint and a catalyst to form a coated cellular polyvinylchloride board; and curing the coated cellular polyvinylchloride board. The method allows for the high speed application of a diverse number of colored coatings onto the cellular polyvinylchloride board.

18 Claims, 1 Drawing Sheet

METHOD FORMING A POLYURETHANE COATED CELLULAR POLYVINYLCHLORIDE BOARD FOR USE AS SIDING

CROSS REFERENCE TO RELATED APPLICATIONS

This application claims the benefit of U.S. Provisional Application No. 60/820,728 filed on Jul. 28, 2006.

BACKGROUND OF THE INVENTION

1. Field of the Invention

The present invention is generally directed to a method of preparing a board for use as siding. More particularly, the invention relates to a high speed application of a polyurethane-based liquid coating onto a cellular polyvinylchloride ("cellular PVC") board, wherein the resulting coated cellular PVC board exhibits improved characteristics including reduced warping and bowing, and improved adhesion, and abrasion and mar resistance.

2. Background of the Invention

Difficulties have been encountered in providing and applying durable protective coatings to siding, wherein, among other things, such siding is used to cover the exteriors of buildings, homes, and lawn and garden furniture, for example. Part of the problem with formulating an effective coating lies in the inherent nature of the substrate used to form the siding. That is, when exposed to its working environment, which includes adverse and fluctuating environmental conditions, such as, heat, cold, ultraviolet radiation, moisture, wind, snow, salt spray, particle impingement, smog, and the like, the substrate tends to expand, contract, and/or flex. Consequently, the constant stress placed on the substrate due to changing environmental conditions and/or handling, causes the prior art coatings to easily peel, chip, blister or otherwise separate from the substrate, necessitating frequent and costly scraping and recoating operations. Additionally, prior art coatings on interior components also deteriorate as a result of the substrate and/or the coating's exposure to wide humidity changes, abrasions, sudden impacts, and contact with corrosive fluids, dirt, grime and the like.

Many of the foregoing durability problems can be attributed to the unsatisfactory adhesion of the coating to the substrate surface due to such coatings not having sufficient bonding with the unique surface of the substrate, as well as proper flexibility consistent with the dynamics of the substrate, balanced with sufficient hardness characteristics.

Accordingly, there has been a need for a coating process which can tightly and durably bond the coating to the cellular PVC substrate and which will resist peeling, blistering and other separation under adverse conditions, including highly variable temperature and humidity conditions. The application process would allow the coating to remain flexible and expandable and resist abrasion and impact. Given all of the above, the coating must possess, most importantly, optimal viscosity and atomization characteristics that lend themselves to a high speed application process thereby maximizing the efficiency of the coated cellular PVC board's manufacture.

In addition to producing a coated substrate that wears better, both in terms of function and aesthetics, greater adhesion and flexibility on the part of the coating would also provide for a greater selection of colors which could be used to create the coating. That is, conventional coatings used to coat siding substrates, are conventionally limited to light colors, i.e., white, light grays, light tans, light beiges, and the like, as these coatings absorb less heat as compared to darker colors, and, hence, result in lower degrees of substrate expansion and splintering as would occurs when a darker color is used to form the coating. Accordingly, what is also needed is a siding material that can come in a myriad number of colors, including both light and dark colors, without concerns of bowing and warping when the siding material is exposed to its environmental conditions.

BRIEF SUMMARY OF THE INVENTION

The foregoing needs have been satisfied by a novel method for applying an improved coating to a cellular PVC board, wherein, compared to conventionally formed coatings applied to conventionally used siding substrates, the coating demonstrates improved adherence to the cellular PVC board, and improved abrasion resistance, mar resistance, hardness, flexibility, and color and gloss retention when applied to a cellular PVC board and exposed to fluctuating environmental conditions. Additionally, the coated cellular PVC board formed from the inventive method exhibits minimal to no tackiness or stickiness such that there is essentially no blocking or sticking of adjacently placed coated cellular PVC boards, thereby, obviating the need for the use of slip sheets between the adjacently disposed coated cellular PVC boards when packaging and shipping the coated cellular PVC boards.

The coating utilized in the novel process disclosed herein comprises a unique ratio of a polyurethane-based paint and a catalyst, wherein the ratio is about 2.6 to 1 of the polyurethane based-paint to the catalyst. The coating is applied to a specially formulated cellular PVC board, which is about one-third the weight of fiber cement and which offers exceptional strength and flexibility along with consistent weight and density. The application of the coating to the cellular PVC board occurs at never before achieved coating speeds, i.e., at speeds of about 200 feet per minute, after the cellular PVC board has been de-ionized and vacuum cleaned. Coating occurs via a plurality of high volume, low pressure ("HVLP") guns which have been programmed to coat the exterior surfaces of the cellular PVC board with about a 6 millimeter thick layer of the coating. The coated cellular PVC board is then dried and cured in a convection oven for about 40 minutes at about 125 degrees Fahrenheit to arrive at a coated cellular PVC board having a coating layer approximately 2 millimeters thick, wherein a coating layer of exactly 2 millimeters has been found to exhibit extraordinarily optimal working characteristics.

As stated above, after high speed application and curing, the coating firmly adheres to cellular PVC and has a greatly improved resistance to peeling and blistering under varying conditions, including high moisture conditions, and over a wide range of temperatures, as compared to the adhesion achieved using prior art coatings on conventionally used substrates.

DETAILED DESCRIPTION OF THE INVENTION

Figure 1:
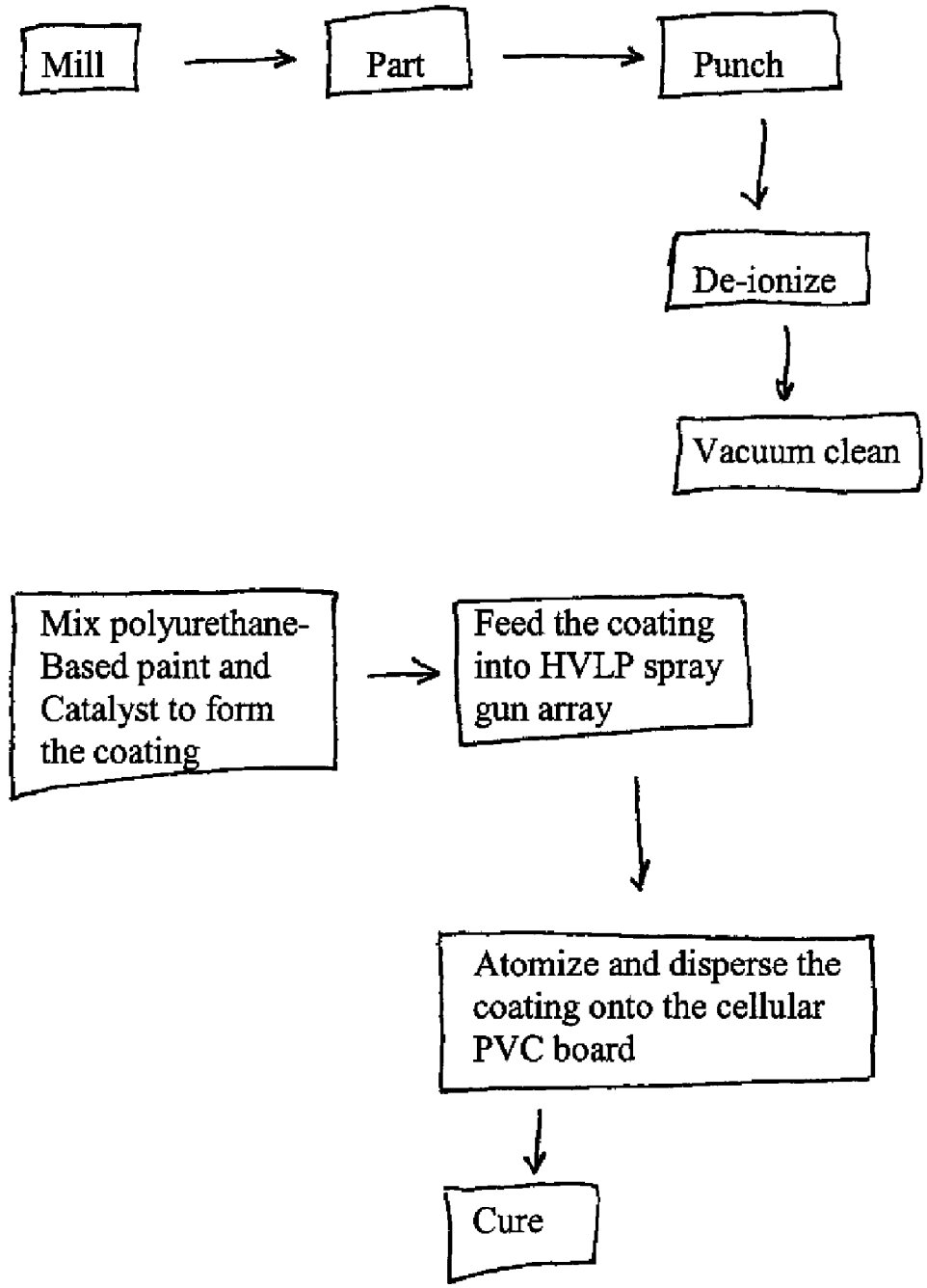
FIG. 1 is a schematic depicting an exemplary method for the formation of an exemplary coated cellular PVC board.

The invention comprises a highly automated production process for the high speed application and cure of a uniquely modified coating onto a specially composed and manufactured cellular PVC boards, wherein the resulting coated cellular PVC board is particularly well adapted for use as, for example, clapboard siding and/or trimboard (collectively referred to as "siding"). The coated cellular PVC board formed from the inventive method displays excellent qualities of hardness and shrink resistance, thereby, making it suitable for use in a variety of colors. The invention, therefore, comprises a novel method which comprises coating a uniquely constructed cellular PVC board with a uniquely modified coating, wherein the inventive cellular PVC board, coating, and process are all taken up in turn and more fully discussed below herein.

Cellular PVC Board.

The cellular PVC board, which serves as the siding substrate, is specially adapted to withstand the processing parameters discussed below and to be compatible with the coating also discussed below. In an exemplary embodiment, the cellular PVC board may comprise, among other things, greater than 75 weight percent ("wt %") of a PVC resin, up to about 5 wt % of calcium carbonate, and up to about 0.5 wt % of titanium dioxide, and up to about 2.5 wt % of a stabilizer, such as, for example, a tin stabilizer, wherein exemplary amounts of each component is set forth below in Table 1. The weight percents set forth in the table are based on the total weights of the total components contained in the cellular PVC board composition after the board is dried and cured. A particularly preferred cellular PVC board suitable for use in the method discussed below is manufactured by Jain Irrigation Systems Ltd.

TABLE 1

Composition of an exemplary cellular PVC board

| Component | Weight Percent (wt %) |
| --- | --- |
| PVC Resin | >75 wt % |
| Tin Stabilizer | <2.5 wt % |
| Calcium Carbonate | <5 wt % |
| Titanium Dioxide | <0.5 wt % |

The Coating.

The coating comprises a polyurethane-based paint and a catalyst. The polyurethane-based paint comprises a base product, one or more high volume solids ("HVS"), and a coupling agent. The base product comprises polyurethane, wherein an acrylic polyurethane is preferred, and where a two component polyurethane enamel is particularly preferred. In an exemplary embodiment, the HVS comprises at least one of silica, titanium dioxide, barium sulfate, and the like. In an exemplary embodiment, the coupling agent comprises methyl amyl ketone ("MAK"), wherein other coupling agents may alternatively or also be used. Additionally, the coating preferably comprises one or more pigments which confer a desired color onto the coating, wherein the color from a group of colors ranging from dark colors, e.g., black on one extreme, to light colors, e.g., white on the other extreme.

In an exemplary embodiment, the catalyst of the coating comprises at least one of acetone, n-butyl acetate, oxo-heptyl acetate, and the like. The catalyst primarily serves to control the rate of the catalyst initiated, low energy curing process with the result of an extremely durable, yet flexible, coating possessing extraordinary adhesion to the cellular PVC board.

In an exemplary embodiment, the coating comprises about 31 to about 34 weight percent ("wt %") of the base product, about 14 to about 23 wt % of the catalyst, about 35 to about 41 wt % of the HVS, and about 9 to about 11 wt % of the coupling agent. Wt % is based on the percentages of each component after the coating has been processed and cured. An exemplary coating comprises a modified form of a coating sold under the trademark Polane® by Sherwin Williams, wherein a particularly preferred exemplary modified form is a solar reflective polyurethane enamel sold under the Polane® trademark.

As will be discussed in further detail below, the coating is applied to the cellular PVC board via an automated atomization control system. As determined by the automated atomization control system, predetermined amounts of the polyurethane-based paint and the catalyst are combined and the resulting coating is then dispensed into a HVLP automated spray gun assembly. Particularly important to the application of the coating to the cellular PVC board via the spray gun assembly is the viscosity of the polyurethane-based paint and the viscosity of the catalyst. That is, as discussed below, the coating is applied to the cellular PVC board via HVLP guns. For the guns to function properly, and to therefore, emit the proper amount of coating at the proper pressure, uniformity, and atomization, it is important that the polyurethane-based paint comprise a viscosity of about 330 centistokes. This viscosity allows the coating to be fed into the HVLP gun(s) at a polyurethane-based paint to catalyst ratio of about 2.6 to 1. This ratio yields a proportioned viscosity of about 150 centistokes for the coating and enables the optimal use of the automated atomization control system, thereby resulting in the lay down of a uniform wet coating on the cellular PVC board having optimal performance characteristics.

A. Performance Properties.

The coating of the present invention is a high speed deposited, production finish that is superior in the area of durability. Furthermore, the inventive coating offers excellent hardness, flexibility, mar and abrasion resistance, and color and gloss retention. It does not dissolve on chemical or solvent attack and the coating exhibits a volatile organic compound ("VOC") emission of under 2.8 pounds per gallon and is free of lead and chromate hazards.

When cured, the coating forms a hard satin finish that protects and remains looking new even when exposed to years of ultraviolet light and regular contact with most types of chemicals and solvents. In addition to exhibiting exceptional adherence to the cellular PVC board, it is also resistant to hydraulic fluid, brake fluid, synthetic cutting and lubricating oils, and other caustic liquids commonly used for the various types of machinery. In mechanical performance tests, the coating does not crack, peel or lose adhesion after 80 inches per pound of direct or reverse impact. When applied to cellular PVC, the coating has greater density and depth of color and even in harsh environments, the coating is able to maintain its satin finish and color.

1. Production Efficiency.

To achieve required economic production throughput, the coating must posses excellent rheology and flow properties to allow for high speed transfer efficiency and leveling. The coating has a relatively high solid composition (59 percent by volume) and applicators can obtain a greater film build in one high speed pass versus conventional urethanes.

2. Regulatory Compliance.

The coating is an environmentally friendly alternative to epoxies and urethanes. The coating exhibits a VOC emission of under 2.8 pounds per gallon and free of lead and chromate hazards. Applicators benefit from improved air quality, greater plant safety and reduced hazardous waste generation for a more hospitable work environment.

3. Adhesion.

When applied to cellular PVC pursuant to the method disclosed above, the coating exhibits an excellent adhesion. Additionally, the coating, with its inherent flexibility, is ideally suited to application on cellular PVC, wherein cellular PVC is prone to expansion and contraction under certain environmental conditions.

Although the invention is not limited to the present disclosure, several examples of exemplary coating compositions of the present invention are disclosed below.

Example 1

Exemplary Coating I

Example 1.
Exemplary Coating I.

| Composition | Weight Percent (wt %) |
|---|---|
| Acrylic Polyurethane | 36 |
| Methyl n-Amyl Ketone | 9 |
| n-Butyl Acetate | 12 |
| Oxo-Heptyl Acetate | 2 |
| Amorphous Precipitated Silica | 7 |
| Titanium Dioxide | 34 |

Volatile organic compounds ("VOC"): 2.78 pounds/gallon
Specific gravity: 1.38
Coating density: 11.45 pounds/gallon

Example 2

Exemplary Coating II

Example 2.
Exemplary Coating II.

| Composition | Weight Percent (wt %) |
|---|---|
| Acrylic Polyurethane | 36 |
| Methyl n-Amyl Ketone | 9 |
| n-Butyl Acetate | 12 |
| Oxo-Heptyl Acetate | 2 |
| Amorphous Precipitated Silica | 7 |
| Titanium Dioxide | 34 |

VOC: 2.77 pounds/gallon
Specific gravity: 1.38
Coating density: 11.47 pounds/gallon

Example 3

Exemplary Coating III

Example 3.
Exemplary Coating III.

| Composition | Weight Percent (wt %) |
|---|---|
| Acrylic Polyurethane | 31 |
| Acetone | 7 |
| Methyl n-Amyl Ketone | 11 |
| n-Butyl Acetate | 14 |
| Oxo-Heptyl Acetate | 2 |
| Amorphous Precipitated Silica | 7 |
| Barium Sulfate | 2 |
| Titanium Dioxide | 26 |

VOC: 3.42 pounds/gallon
Specific gravity: 1.28

Method.

Referring to FIG. 1, prior to coating the specially formulated cellular PVC board, the cellular PVC board is de-ionized and vacuum cleaned. An exemplary de-ionization and vacuum system is that developed and manufactured by SIMCO and described by SIMCO as a neutro-vac intake in which an MEB/ME 100 static bar is used to eliminate charges on the cellular PVC board. In an exemplary method, the cellular PVC board passes at a rate of about 200 feet per minute under a static bar to neutralize any existing charges. The cellular PVC board then passes under a stiff bristle brush and an aggressive blast of about 100 pounds per square inch ("psi") of compressed air which lifts debris from the cellular PVC board. The debris is captured and drawn into the vacuum system.

Once the cellular PVC board is de-ionized, such that the board is neutrally charged, and vacuum cleaned to remove any debris, the cellular PVC board is transported, longitudinally at about 200 feet per minute, lying flat, through a properly evacuated paint booth where the coating is applied. The paint booth contains an array of specially developed, pneumatic, HVLP spray guns that apply a consistent and approximate 6 millimeter thick coating onto the exterior surfaces of the cellular PVC board while the cellular PVC board is traveling at about 200 feet per minute. The HVLP spray guns are supplied with precisely controlled pressurized air and pressurized, mixed, polyurethane-based paint. The HVLP spray guns utilize the pressurized air to atomize and propel the polyurethane-based paint onto the cellular PVC board.

The polyurethane-based paint is first mixed with the catalyst such that the ratio of the polyurethane-based paint to catalyst is about 2.6 to 1. Mixing occurs by the pressurized delivery of the polyurethane-based paint and the catalyst into a fluid metering system, such as the metering system which is sold by ITW Ransburg under the trademark DynaFlow™. Once properly mixed, the metering system dispenses the coating under pressure to each HVLP spray gun.

Pumping systems located in a paint room deliver the polyurethane-based paint to two color selection valve stacks, and deliver the catalyst to a primary proportioning valve from totes and/or 55-gallon drums. The polyurethane-based paint circulates through these two valve color selection stacks. One of the stacks supplies the selected color of polyurethane-based paint for a production run to the primary proportioning valve at a pressure of about 90 psi.

The primary proportioning valve then precisely and automatically proportions the polyurethane-based paint to the catalyst, which is supplied at about 75 psi and then supplies the proportioned mixture, under pressure to the HVLP spray gun array. The HVLP spray gun array then atomizes and propels the polyurethane-based paint onto the cellular PVC board.

In an exemplary embodiment, HVLP spray gun array comprises at least 5 individual spray guns, wherein four of the five spray guns emit the coating at a fluid pressure of about 20 psi and an atomization pressure of about 65 psi. Additionally, in an exemplary embodiment, the remaining spray gun emits the coating at a fluid pressure of about 15 psi, and an atomization pressure of about 28 psi.

Once the cellular PVC board is coated, the resulting coated cellular PVC board is then dried and cured. In a preferred embodiment, it is recommended to use a forced air convection curing process to cure the coated cellular PVC board. A design residency time of about 40 minutes allows the flexibility of operating at a lower cure temperature and lower energy consumption. In an exemplary embodiment, the coated cellular PVC board is laterally fed into a specially constructed curing tunnel. The coated board travels laterally through the curing tunnel on a single elevation, continuous motion conveyor system at a speed of approximately 2 feet per minute. This curing tunnel provides about 10 minutes of flash-off time at ambient temperature, about 20 minutes of cure time at about 125 degrees Fahrenheit, and about 10 minutes of cool down. Alternatively, the coating can be set and cured at room temperature (about 50 degrees to about 75 degrees Fahrenheit) for 24 hours. After curing the coating is reduced to a uniform thickness of about 2 mils, wherein this thickness has been found to confer optimal performance characteristics onto the coated cellular PVC board.

In summary, the method discussed above provides for a high speed application of a specially formulated coating onto a cellular PVC board, wherein an exemplary use of the resulting coated cellular PVC board is as siding material. The resulting coated cellular PVC board has improved properties when used as siding material as compared to prior art siding materials, wherein such properties include improved adhesion between the coating the cellular PVC board, and resistance to peeling, blistering, chipping, scratching and fading. Furthermore, due to these properties, the coating may comprise a variety of colors, where concerns relating to the absorption of heat energy by the particular type of colored coating may be alleviated.

With the aim or creating a coated cellular board for use as siding material, in another embodiment of the present invention, prior to de-ionizing, vacuuming, coating, and curing the cellular PVC board, the cellular PVC board may first be milled, parted, and punched. The milling operation and milling parts are detailed in U.S. Provisional Patent Application No. 60/820,979; the parting operation and parting parts are detailed in U.S. application Ser. No. 11/770,844; and the punching operation and punching parts are detailed in U.S. application Ser. No. 11/750,457; all applications of which are commonly owned, and which are incorporated in their entirety hereto.

Although the principles of the present invention have been illustrated and explained in the context of certain specific embodiments, it will be appreciated by those having skill in the art that various modifications beyond those illustrated can be made to the disclosed embodiment without departing from the principles of the present invention. For example, the colors, sizes of cellular PVC and other variables can be integrated.

What is claimed is:

1. A method for forming a polyurethane coated cellular polyvinylchloride board for use as siding, comprising:
    providing a polyurethane-based paint comprising a polyurethane-containing base product, a high volume solid, and a coupling agent;
    providing a catalyst;
    combining the polyurethane-based paint with the catalyst to form a coating, wherein the coating comprises a ratio of polyurethane-based paint to catalyst of about 2.6 to 1;
    coating the cellular polyvinylchloride board with the coating to form a coated cellular polyvinylchloride board; and
    curing the coated cellular polyvinylchloride board, where, after cure, the coating comprises about 31 to about 34 wt % of the polyurethane-containing base product, about 35 to about 41 wt % of the high volume solid about 9 to about 11 wt % of the coupling agent, and about 14 to about 23 wt % of the catalyst.

2. The method of claim 1, wherein coating comprises applying about a 6 millimeter layer of the coating to the cellular polyvinylchloride board prior to curing the coated cellular polyvinylchloride board.

3. The method of claim 1, wherein the polyurethane-based paint comprises a viscosity of about 330 centistokes prior to combining the polyurethane-based paint with the catalyst.

4. The method of claim 1, wherein the coating comprises a viscosity of about 150 centistokes.

5. The method of claim 4, further comprising feeding the coating into a plurality of high volume, low pressure spray guns.

6. The method of claim 5, further comprising pressurizing the coating once it is in the high volume, low pressure spray guns.

7. The method of claim 6, wherein the plurality of high volume, low pressure spray guns comprises five spray guns, wherein four of the five spray guns emit the coating in the form of a spray at a fluid pressure of about 20 psi and at atomization pressure of about 65 psi, and the remaining spray gun emits the coating at a fluid pressure of about 15 psi and an atomization pressure of about 28 psi.

8. The method of claim 7, wherein coating further comprises passing the cellular polyvinylchloride board through the spray at a rate of about 200 feet per minute.

9. The method of claim 8, wherein coating further comprises spraying about a 6 millimeter thick layer of the coating onto the exterior surfaces of the board.

10. The method of claim 8, further comprising adding one or more pigments to the polyurethane-based coating, wherein the pigment(s) confer a color onto the coated cellular polyvinylchloride board, wherein the color is selected from a group ranging from dark colors to light colors.

11. The method of claim 8, wherein curing comprises exposing the coated cellular polyvinylchloride board to a temperature, for an amount of time until the coating on the coated cellular polyvinylchloride board comprises a thickness of about 2 millimeters.

12. The method of claim 1, wherein the polyurethane-containing base product comprises an acrylic polyurethane.

13. The method of claim 12, wherein the high volume solid comprises at least one of silica, titanium dioxide, and barium sulfate.

14. The method of claim 13, wherein the coupling agent comprises methyl amyl ketone.

15. The method of claim 13, wherein the catalyst comprises at least one of acetone, n-butyl acetate, and oxo-heptyl acetate.

16. The method of claim 1, wherein the cellular polyvinylchloride board comprises at least about 75 wt % of a polyvinyl chloride resin, wherein the wt % is based upon a total weight of the board after curing.

17. The method of claim 16, wherein the cellular polyvinylchloride board further comprises up to about 5 wt % of calcium carbonate, up to about 0.5 wt % of titanium dioxide, and up to about 2.5 wt % of a stabilizer, wherein the wt % is based upon a total weight of the board after curing.

18. The method of claim 1, wherein curing comprises exposing the coated cellular polyvinylchloride board to a temperature for an amount of time until the coating on the coated cellular polyvinylchloride board comprises a thickness of about 2 millimeters.

* * * * *